United States Patent
Reddy et al.

(10) Patent No.: US 10,735,203 B2
(45) Date of Patent: Aug. 4, 2020

(54) SHARING NETWORK SECURITY THREAT INFORMATION USING A BLOCKCHAIN NETWORK

(71) Applicant: Cisco Technology, Inc., San Jose, CA (US)

(72) Inventors: K. Tirumaleswar Reddy, Bangalore (IN); Prashanth Patil, San Jose, CA (US); Puneeth Rao Lokapalli, Bangalore (IN); Carlos M. Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 200 days.

(21) Appl. No.: 15/728,208

(22) Filed: Oct. 9, 2017

(65) Prior Publication Data

US 2019/0109717 A1    Apr. 11, 2019

(51) Int. Cl.
*H04L 9/32* (2006.01)
*H04L 9/06* (2006.01)
*H04L 29/06* (2006.01)

(52) U.S. Cl.
CPC .......... *H04L 9/3247* (2013.01); *H04L 9/0643* (2013.01); *H04L 9/3239* (2013.01); *H04L 63/1433* (2013.01); *H04L 2209/38* (2013.01)

(58) Field of Classification Search
CPC ... H04L 9/3247; H04L 9/0643; H04L 9/3239; H04L 63/1433; H04L 63/1416
See application file for complete search history.

(56) References Cited

U.S. PATENT DOCUMENTS

| | | |
|---|---|---|
| 9,569,771 B2 | 2/2017 | Lesavich et al. |
| 2016/0261690 A1 | 9/2016 | Ford |

(Continued)

FOREIGN PATENT DOCUMENTS

| | | |
|---|---|---|
| CN | 206237441 U | 6/2017 |
| WO | 2017066002 A1 | 4/2017 |

OTHER PUBLICATIONS

"Sharing threat intelligence just got a lot easier!", Cyber Threat Intelligence Technical Committee, https://oasis-open.github.io/cti-documentation/, Sep. 2017, 3 pgs.

(Continued)

*Primary Examiner* — Noura Zoubair
(74) *Attorney, Agent, or Firm* — Edell, Shapiro & Finnan, LLC

(57) ABSTRACT

In an example embodiment, a validating peer of a plurality of validating peers in a blockchain network receives, from a non-validating peer, a request to create a root block of a blockchain. The root block includes information related to a potential computer security threat. The validating peer creates the root block with a root block pending validation status. The validating peer shares, with other validating peers of the plurality of validating peers, a notification of the root block with the root block pending validation status to provide an indication of the information. The validating peer determines whether the information is authentic. If the information is determined to be authentic, the validating peer changes the root block pending validation status to a root block authenticated validation status and shares, with the other validating peers, a notification of the root block authenticated validation status to indicate that the information is authentic.

20 Claims, 5 Drawing Sheets

(56) References Cited

U.S. PATENT DOCUMENTS

2016/0275461 A1 9/2016 Sprague et al.
2017/0103472 A1 4/2017 Shah
2017/0279818 A1* 9/2017 Milazzo .............. H04L 63/1416

OTHER PUBLICATIONS

"XACML", Wikipedia, https://en.wikipedia.org/wiki/XACML, Sep. 2017, 14 pgs.

"Joy: A package for capturing and analyzing network flow data and intraflow data, for network research, forensics, and security monitoring", Cisco, GitHub, Inc., https://github.com/cisco/joy, Last Accessed Oct. 2, 2017, 5 pgs.

E. Lear, "Manufacturer Usage Description Framework", draft-lear-mud-framework-00, Network Working Group, Jan. 21, 2016, 11 pgs.

Gautham, "Cisco, Bosch and Foxconn Create an IoT Blockchain Consortium", http://www.newsbtc.com/2017/01/29/cisco-bosch-foxconn-create-iot-blockchain-consortium, Jan. 29, 2017, 4 pgs.

Cyber Threat Alliance, "Cyber Threat Alliance Expands Mission through Appointment of President, Formal Incorporation as Not-for-Profit and New Founding Members", www.cyberthreatalliance.org/pr/pr-021317.html, Feb. 13, 2017, 7pgs.

Chabrow, "Blockchain Seen as a Secure Cyberthreat Info Sharing Tool", Bank Info Security, http://www.bankinfosecurity.com/interviews/blockchain-seen-as-secure-cyberthreat-info-sharing-tool-i-3543, Mar. 24, 2017, 2 pgs (Audio Recording).

Castro et al., "Practical Byzantine Fault Tolerance", Laboratory for Computer Science, Massachusetts Institute of Technology, Proceedings of the Third Symposium on Operating Systems Design and Implementation, New Orleans, USA, Feb. 1999, 14 pgs.

"Protocol Specification", GitHub, Inc., https://github.com/hyperledger-archives/fabric/blob/master/docs/protocol-spec.md, Jul. 22, 2016, 65 pgs.

Hsieh, PH.D., et al., "Leveraging Blockchain Technology to Protect the National Security Industrial Base From Supply Chain Attacks", Center on Sanctions & Illicit Finance, Foundation for Defense of Democracies, Jul. 11, 2017, 9 pgs.

* cited by examiner

SHARING NETWORK SECURITY THREAT INFORMATION USING A BLOCKCHAIN NETWORK

TECHNICAL FIELD

The present disclosure relates to network security.

BACKGROUND

Computer networks and devices routinely face security threats due to software becoming outdated, newly discovered gaps in security, and other factors. These security threats can permit bad actors to retrieve the private and/or confidential information of one or more users, or take or disrupt the performance of computing or networking functions. Bad actors can exploit this information for identity theft, ransom, and other illicit purposes.

DESCRIPTION OF EXAMPLE EMBODIMENTS

Overview

In an example embodiment, a validating peer of a plurality of validating peers in a blockchain network receives, from a non-validating peer, a request to create a root block of a blockchain. The root block includes information related to a potential computer security threat. The validating peer creates the root block with a root block pending validation status. The validating peer shares, with other validating peers of the plurality of validating peers, a notification of the root block with the root block pending validation status to provide an indication of the information related to the potential computer security threat. The validating peer determines whether the information related to the potential computer security threat is authentic. If the information related to the potential computer security threat is determined to be authentic, the validating peer changes the root block pending validation status to a root block authenticated validation status and shares, with the other validating peers, a notification of the root block authenticated validation status to indicate to the other validating peers that the information related to the potential computer security threat is authentic.

Example Embodiments

Network security service vendors are beginning to form alliances to share threat information with each other in order to improve defenses for cyber-attacks against enterprises (e.g., member companies) and customers (e.g., Internet of Things (IoT) device users). However, in conventional arrangements a security service vendor gathers threat information manually and in isolation, and then shares the threat information with other security service vendors. This can lead to, among other problems, trust issues between security vendors. That is, security vendors may not trust the threat information published by other security vendors (or other entities such as independent security researchers, IoT manufacturers, software providers, etc.). For example, such entities may have economically competitive motivations for reporting security threats to certain devices produced by their competitors, or may simply be unreliable or unknowledgeable about particular issues.

As such, automated mechanisms are presented herein for sharing threat information, and for determining whether such information is authentic. As described in greater detail below, these mechanisms address trust issues using blockchain-based decentralized techniques. Various entities may join or communicate with a blockchain network to share threat information. These entities may also obtain information to resolve/mitigate the threat information (e.g., by retrieving policy configurations to protect resources).

Figure 1:
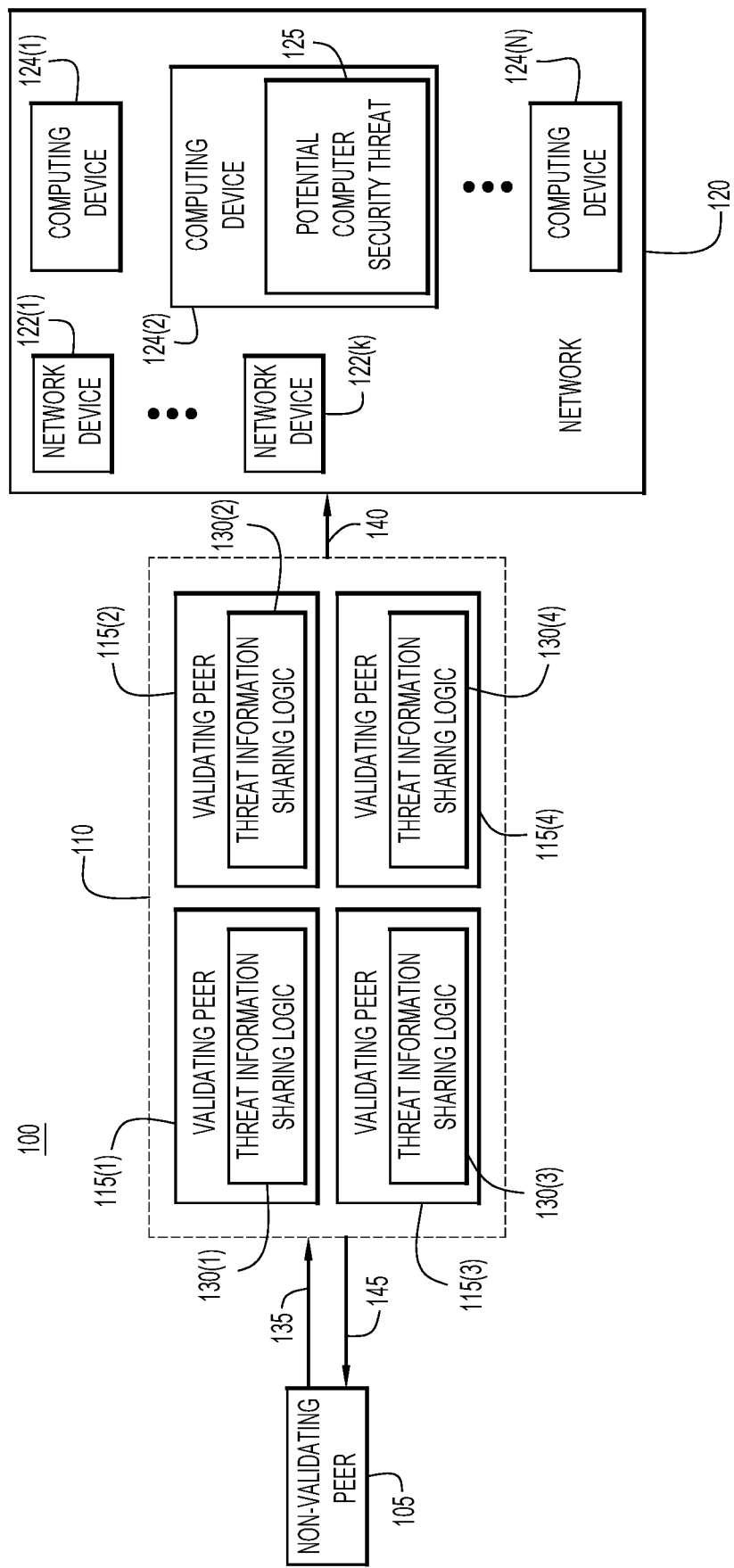
FIG. 1 illustrates a system configured for network threat information sharing, according to an example embodiment.

With reference made to FIG. 1, shown is a system 100 configured for sharing network security threat information in accordance with examples presented herein. The system 100 includes a non-validating peer 105, a blockchain network 110 of validating peers 115(1)-115(4), and a network 120 that includes a plurality of network devices 122(1)-122(K) and a plurality of computing devices 124(1)-124(N), one of which, e.g., device 124(2), has a potential computer security threat 125. It should be understood that the security threat could occur just as well on one of the network devices 122(1)-122(K).

In this example, the non-validating peer 105 is a client device, and the non-validating peer 105 is associated with an IoT manufacturer or an operating system and software provider. The validating peers 115(1)-115(4) may be associated with, for example, security service vendors or security experts. In one example, validating peer 115(1) is associated with a network provider; validating peer 115(2) with a security service vendor; validating peer 115(3) is associated with an antivirus software vendor; and validating peer 115(4) is associated with a security expert from a university. The validating peers 115(1)-115(4) may be more trusted for determining the authenticity of potential computer security threats than non-validating peer 105.

In one example, the network 120 may be a home network and the network devices 122(1)-122(K) may be one or more middleboxes. In another example, the network 120 may be an enterprise network and the network devices 122(1)-122(K) may be a firewall/edge router. In one example, network 120 is a non-validating peer. As mentioned, network 120 has a potential computer security threat 125 on one of the network devices 122(1)-122(K) or one of the computing devices 124(1)-124(N), e.g., computing device 124(2). Conventionally, a network 120 may not receive notice of a potential computer security threat because such information is obtained manually and in isolation. Moreover, even if a network 120 does receive information relating to a potential computer security threat, the network receives such information from one or more entities (e.g., security service vendors, independent security researchers, IoT manufacturers, software providers, etc.), and is unable to determine whether these entities are trustworthy. In other words, conventionally, the network 120 is unable to determine whether the information is authentic.

The following example highlights shortcomings of the aforementioned and other conventional techniques. Consider an example scenario in which a consumer purchased an IoT camera from a vendor and, one year later, discovered that the IoT camera is running an outdated Secure Sockets Layer (SSL) library that has a known vulnerability allowing anyone to obtain video captured by the IoT camera. If the vendor has gone out of business, or if the vendor simply does not have the resources (e.g., ability, time, money, etc.) to profile the IoT camera in great detail to address changing security vulnerabilities, the consumer may not be able to protect against this vulnerability. Thus, the consumer may decide to dispose of the IoT camera even though the IoT camera functions well aside from the security vulnerability.

As such, in accordance with the embodiments presented herein, threat information sharing logic 130(1)-130(4) is provided on respective validating peers 115(1)-115(4) to enable operations described herein. In one example, threat information sharing logic 130(1)-130(4) enables automatically providing network 120 with authenticated information relating to the potential computer security threat 125. This information may include a description of the potential computer security threat 125 and/or solutions for addressing the potential computer security threat 125. The information (e.g., security policy information) may be represented in eXtensible Access Control Markup Language (XACML) to enable interoperability between multiple security vendors. Network 120 may use this information to take appropriate measures with respect to the potential computer security threat 125.

For instance, in the above example of the IoT camera having an outdated SSL library, the user may receive information relating to resolving the vulnerability of the IoT camera, such as configuring a firewall, an Intrusion Prevention System (IPS), or an analytics tool to examine certain network traffic passing through the camera, or installing and routing network traffic through a Transport Layer Security (TLS) proxy. Other examples of the information relating to resolving the vulnerability include signatures to detect new threats, new Distributed Denial of Service (DDoS) attack details, malware characteristics, software vulnerabilities, security vulnerabilities, patches to fix vulnerabilities, secure communication to protect non-security compliant IoT devices, etc.

In one example, the information identifies examples of benign (legitimate) network traffic and examples of malicious (illegitimate) network traffic so as to permit network 120 to distinguish, via Machine Learning (ML) or other techniques, between the benign network traffic and the malicious network traffic. For instance, the information may include benign and malicious traffic for training an ML classifier associated with the network 120. This traffic may be represented with Packet Captures (PCAPs), Internet Protocol Flow Information Export (IPFIX), or an output of the Joy package, which may include TLS metadata, Hypertext Transfer Protocol (HTTP) headers, Domain Name System (DNS) requests, sequences of packet lengths and times, and byte distribution. Further information on the Joy package is available at https://github.com/davidmcgrew/joy, which is incorporated herein by reference.

Various entities (e.g., security service vendors, IoT manufacturers, security experts, etc.) may communicate with the blockchain network 110 as non-validating peer 105 and/or validating peers 115(1)-115(4). Non-validating peer 105 may discover potential computer security threat 125, and may publish information relating to potential computer security threat 125. In one example, validating peer 115(1) receives, from non-validating peer 105, a request (shown at 135) to create a root block of a blockchain that includes information identifying potential computer security threat 125. The non-validating peer 105 may optionally determine whether to publish a new root block (e.g., whether the information is already known in the blockchain network 110) before sending the request. The validating peer 115(1) may receive this request directly from the non-validating peer 105, or indirectly from the non-validating peer 105 (e.g., via validating peer 115(2)). The validating peer 115(1) creates the root block with a root block pending validation status at a ledger of the validating peer 115(1). For example, the root block may initially be marked as "pending."

Validating peer 115(1) may send a notification of the root block. In one example, at 140, the validating peer 115(1) may send the notification (directly or indirectly) to network 120. In another example, validating peer 115(1) may send the notification (directly or indirectly) to one or more of the validating peers 115(2)-115(4). In general, information of the root block and root block pending validation status is propagated to enable entities in system 100 to update their respective ledgers accordingly. At 145, the validating peer 115(1) may also send a notification (directly or indirectly) to the non-validating peer 105 that the root block has a root block pending validation status.

Validating peer 115(1) may further determine whether the information is authentic. Validating peer 115(1) may make this determination by reaching a consensus with validating peers 115(2)-115(4) based on one or more communications between validating peer 115(1) and validating peers 115(2)-115(4). In one example, validating peers 115(1)-115(4) may reach a consensus using the Practical Byzantine Fault Tolerance (PBFT) protocol. In executing the PBFT protocol in a blockchain network of N nodes, a minimum of $2*f+1$ (where $f=(N-1)/3$) validating peers need to reach a consensus to determine whether a potential computer security threat is authentic. The network can withstand f number of Byzantine nodes (i.e., f number of nodes with arbitrary failures).

If the information is determined to be authentic, validating peer 115(1) may change the root block pending validation status to a root block authenticated validation status. For example, the root block may be marked as "success." The validating peer 115(1) may further send a notification of the root block authenticated validation status. In one example, the validating peer 115(1) may send the notification of the root block status change (directly or indirectly) in network 120. In another example, validating peer 115(1) may send the notification of the root block status change (directly or indirectly) to one or more of the validating peers 115(2)-115(4). In general, information of the root block status change is propagated to enable entities in system 100 to update their respective ledgers accordingly. The validating peer 115(1) may also send a notification to the non-validating peer 105 that the root block has a root block success validation status.

Conversely, if the information is determined to be inauthentic, the validating peer 115(1) may change the root block pending validation status to a root block inauthenticated validation status. For example, the root block may be marked as "failure." The validating peer 115(1) may send a notification of the root block inauthenticated validation status (directly or indirectly). In one example, the validating peer 115(1) may send the notification of the root block status change to network 120. In another example, validating peer 115(1) may send the notification of the root block status change to one or more of the validating peers 115(2)-115(4). In general, information of the root block status change is propagated in system 100 to enable entities to update their respective ledgers accordingly. The validating peer 115(1) may also send a notification to the non-validating peer 105 that the root block has a root block failure validation status.

Network 120 may retrieve and process the information to enforce appropriate security policies. For example, if the validating peers 115(1)-115(4) determine that the information is authentic, the network 120 may notify a network administrator of the information relating to the potential computer security threat 125. The network 120 may also/alternatively configure a firewall to protect resources from the potential computer security threat 125; configure an IPS to use new signatures to detect and block malicious flows; configure a firewall to allow an IoT device to send or receive communications associated with specified destinations/protocols/ports; examine a PCAP to determine whether certain device behavior is expected; etc. The network 120 may automatically implement these configurations on one or more of the network devices 122(1)-122(K) or one or more of the computing devices 124(1)-124(N), or the network administrator may manually implement these configurations. One or more of the network devices 122(1)-122(K) or one or more of the computing devices 124(1)-124(N) may implement these configurations.

Example embodiments presented herein may also include reputation scores. The role of an entity in a system may be determined based on its reputation score. For example, well-known security companies, operating system providers, IoT manufacturers, and established vendors may have high reputation scores and therefore be assigned the role of, or join the network as, validating peers. Other entities such as independent security researchers, security experts, security practitioners, and new members of the system may have low reputation scores and therefore be assigned the role of, or join the system as, non-validating peers.

The reputation score of an entity may increase or decrease based on the activity of the entity in the blockchain network. For example, if the information is determined to be inauthentic, the reputation score of the non-validating peer 105 may be decreased. Conversely, if the information is determined to be authentic, a reputation score of the non-validating peer 105 may be increased. In one example, the reputation score of the non-validating peer 105 may be increased above a threshold score so as to promote the non-validating peer 105 to a validating peer.

In another example, if the validating peer 115(1) correctly determines whether the information is authentic (e.g., if an individual determination of the validating peer 115(1) agrees with the consensus between validating peers 115(1)-115(4)), the reputation score of the validating peer 115(1) may be increased. Conversely, if the validating peer 115(1) incorrectly determines whether the information is authentic (e.g., if the individual determination of the validating peer 115(1) disagrees with the consensus between validating peers 115(1)-115(4)), the reputation score of the validating peer 115(1) may be decreased. In one example, the reputation score of the validating peer 115(1) may be decreased below a threshold score so as to demote the validating peer 115(1) to the status of a non-validating peer.

After the root block is authenticated, any entity in the system 100 that has supplemental information relating to the potential computer security threat 125 may create an additional block and link the additional block to the previously authenticated root block. For example, validating peer 115(1) may receive, from the non-validating peer 105 or another non-validating peer in the system 100, a request to create an additional block that includes supplemental information related to the potential computer security threat 125. The validating peer 115(1) may receive this request directly from the non-validating peer 105, or indirectly from the non-validating peer 105 (e.g., via validating peer 115(2)). The validating peer 115(1) may create the additional block in the blockchain with an additional block pending validation status at the ledger of validating peer 115(1). For example, the additional block may initially be marked as "pending."

Validating peer 115(1) may send a notification of the additional block. In one example, the validating peer 115(1) may send the notification (directly or indirectly) to network 120. In another example, validating peer 115(1) may send the notification (directly or indirectly) to one or more of the validating peers 115(2)-115(4). In general, information of the additional block and additional block pending validation status is propagated to enable entities of the system 100 to update their respective ledgers accordingly. The validating peer 115(1) may also send a notification (directly or indirectly) to the non-validating peer 105 that the additional block has an additional block pending validation status.

Validating peer 115(1) may further determine whether the supplemental information is authentic (e.g., by reaching a consensus with validating peers 115(2)-115(4)). If the supplemental information is determined to be authentic, validating peer 115(1) may change the additional block pending validation status to an additional block authenticated validation status (e.g., by marking the additional block as "success"). The validating peer 115(1) may further send a notification of the additional block authenticated validation status (e.g., to network 120, to one or more of the validating peers 115(2)-115(4), etc.). In general, information of the additional block status change is propagated to enable entities of the system 100 to update their respective ledgers accordingly. The validating peer 115(1) may also send a notification to the non-validating peer 105 that the additional block has an additional block success validation status. As described above in conjunction with the root block, network 120 may retrieve and process the supplemental information to enforce appropriate security policies. Reputation scoring may also be implemented for the additional block in a similar manner to the root block.

Figure 2:
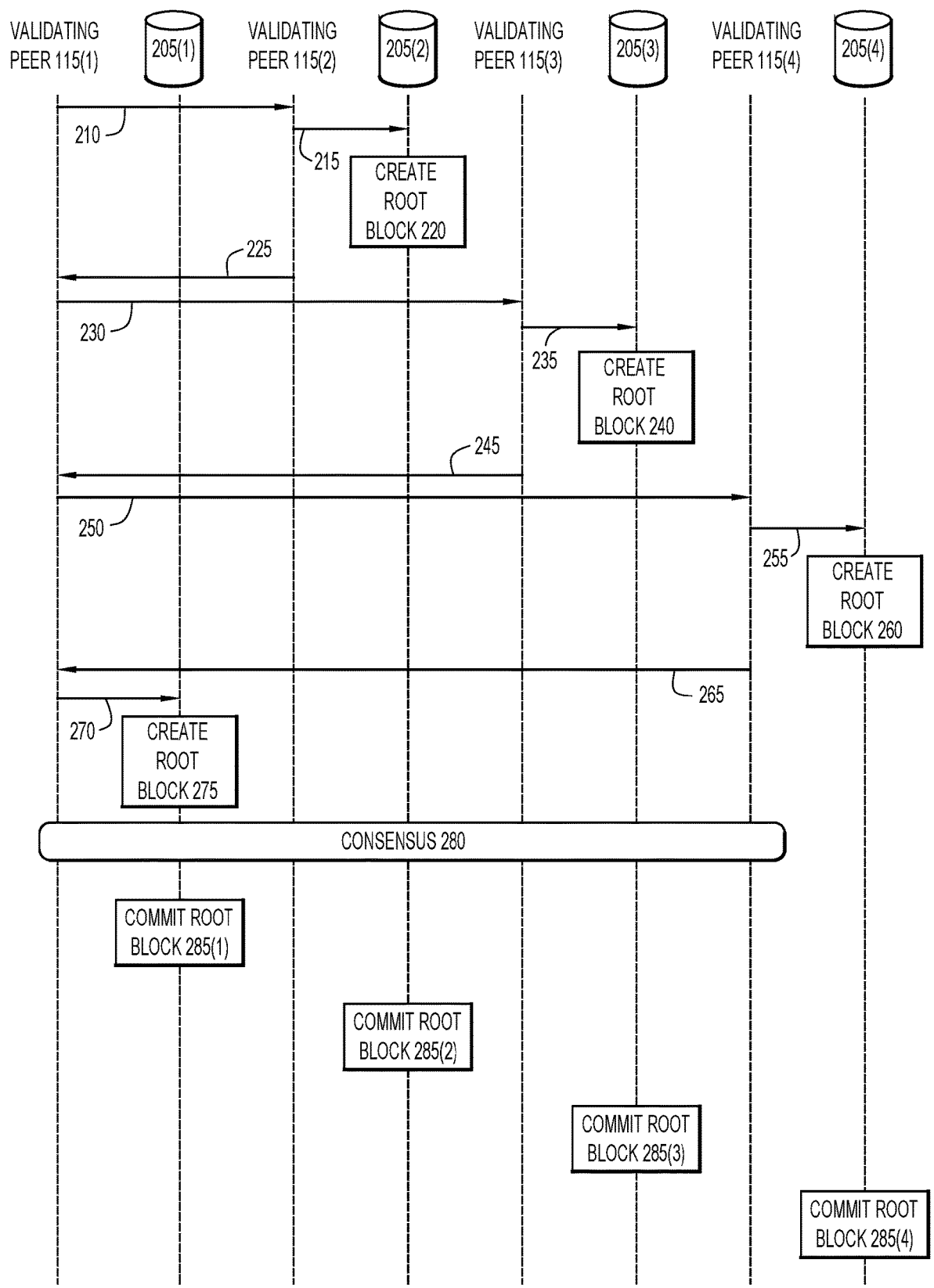
FIG. 2 is a sequence diagram illustrating operations for root block creation and notification in a blockchain network, according to an example embodiment.

Reference is now made to FIG. 2, with continued reference to FIG. 1. FIG. 2 illustrates a sequence diagram illustrating operations for root block creation and notification in blockchain network 110 in accordance with examples presented herein. FIG. 2 shows interactions between validating peers 115(1)-115(4) and their respective ledgers depicted at reference numerals 205(1)-205(4). Initially, validating peer 115(1) receives request 135 to create a root block (shown in FIG. 1) that includes information related to potential computer security threat 125. At 210, validating peer 115(1) sends a notification to validating peer 115(2) to create the root block at ledger 205(2). At 215, validating peer 115(2) commands the ledger 205(2) to create the root block. At 220, the ledger 205(2) creates the root block. At 225, the validating peer 115(2) sends a notification of a root block validation status (e.g., root block authenticated validation status ("success"), root block inauthenticated validation status ("failure"), or root block pending validation status ("pending")) to validating peer 115(1). In this example, the root block is placed in a pending state.

At 230, validating peer 115(1) sends a notification to validating peer 115(3) to create the root block at ledger 205(3). At 235, validating peer 115(3) commands the ledger 205(3) to create the root block. At 240, the ledger 205(3) creates the root block. At 245, validating peer 115(3) sends a root block pending validation status notification to validating peer 115(1). At 250, validating peer 115(1) sends a notification to validating peer 115(4) to create the root block at ledger 205(4). At 255, validating peer 115(4) commands the ledger 205(4) to create the root block. At 260, the ledger 205(4) creates the root block. At 265, validating peer 115(4) sends a root block pending validation status notification to validating peer 115(1). At 270, validating peer 115(1) commands the ledger 205(1) to create the root block. At 275, the ledger 205(1) creates the root block. Thus, ledgers 205(1)-205(4) of validating peers 115(1)-115(4) all have the root block.

At 280, validating peers 115(1)-115(4) may reach a consensus (e.g., using PBFT protocol). In this example, the consensus is that the information in the root block is authentic. As such, at 285(1)-285(4), the validating peers 115(1)-115(4) commit the root blocks to the ledgers 205(1)-205(4) by changing the root block pending validation status to a root block authenticated validation status at each respective ledger 205(1)-205(4). Thus, validating peers 115(1)-115(4) have created the root block marked as "success" at ledgers 205(1)-205(4). As explained above, the validating peers 115(1)-115(4) may send a notification of the root block to the network 120 (FIG. 1) to enable the network 120 to take any appropriate action with regard to the potential computer security threat 125.

Figure 3:
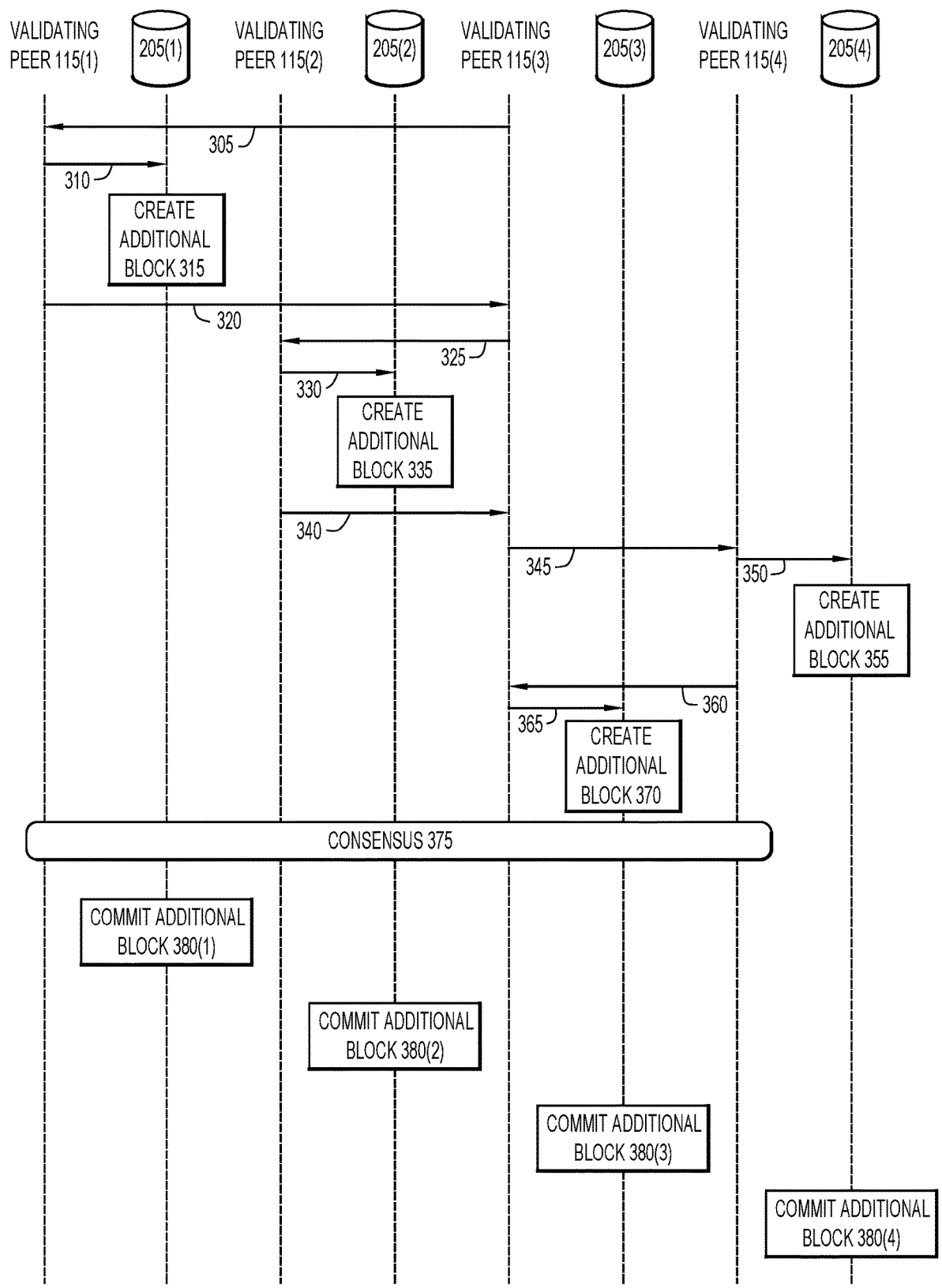
FIG. 3 is a sequence diagram illustrating operations for additional block creation and notification in a blockchain network, according to an example embodiment.

Reference is now made to FIG. 3. FIG. 3 illustrates a sequence diagram illustrating additional block creation and notification in blockchain network 100 in accordance with examples presented herein. Initially, validating peer 115(3) receives a request to create an additional block (not shown in FIG. 3) that includes supplemental information related to potential computer security threat 125. The validating peer may receive the request from non-validating peer 105 or another entity in the system 100. At 305, validating peer 115(3) sends a notification to validating peer 115(1) to create the additional block at ledger 205(1). At 310, validating peer 115(1) commands the ledger 205(1) to create the additional block. At 315, the ledger 205(1) creates the additional block, which is linked to the root block. At 320, the validating peer 115(2) sends a notification of an additional block validation status (e.g., additional block authenticated validation status ("success"), additional block inauthenticated validation status ("failure"), or additional block pending validation status ("pending")) to validating peer 115(1). In this example, the additional block is placed in a pending state.

At 325, validating peer 115(3) sends a notification to validating peer 115(2) to create the additional block at ledger 205(2). At 330, validating peer 115(2) commands the ledger 205(2) to create the additional block. At 335, the ledger 205(2) creates the root block. At 340, validating peer 115(3) sends an additional block pending validation status notification to validating peer 115(3). At 345, validating peer 115(3) sends a notification to validating peer 115(4) to create the root block at ledger 205(4). At 350, validating peer 115(4) commands the ledger 205(4) to create the additional block. At 355, the ledger 205(4) creates the root block. At 360, validating peer 115(4) sends an additional block pending validation status notification to validating peer 115(3). At 365, validating peer 115(3) commands the ledger 205(3) to create the additional block. At 370, the ledger 205(1) creates the additional block. Thus, ledgers 205(1)-205(4) of validating peers 115(1)-115(4) all have the additional block.

At 375, validating peers 115(1)-115(4) may reach a consensus (e.g., using PBFT protocol). In this example, the consensus is that the information in the additional block is authentic. As such, at 380(1)-380(4), the validating peers 115(1)-115(4) commit the additional blocks to the ledgers 205(1)-205(4) by changing the additional block pending validation status to an additional block authenticated validation status at each respective ledger 205(1)-205(4). Thus, validating peers 115(1)-115(4) have created the additional block marked as "success" at ledgers 205(1)-205(4). As explained above, the validating peers 115(1)-115(4) may send a notification of the additional block to the network 120 (FIG. 1) to enable the network 120 to take any appropriate action with regard to the potential computer security threat 125.

Figure 4:
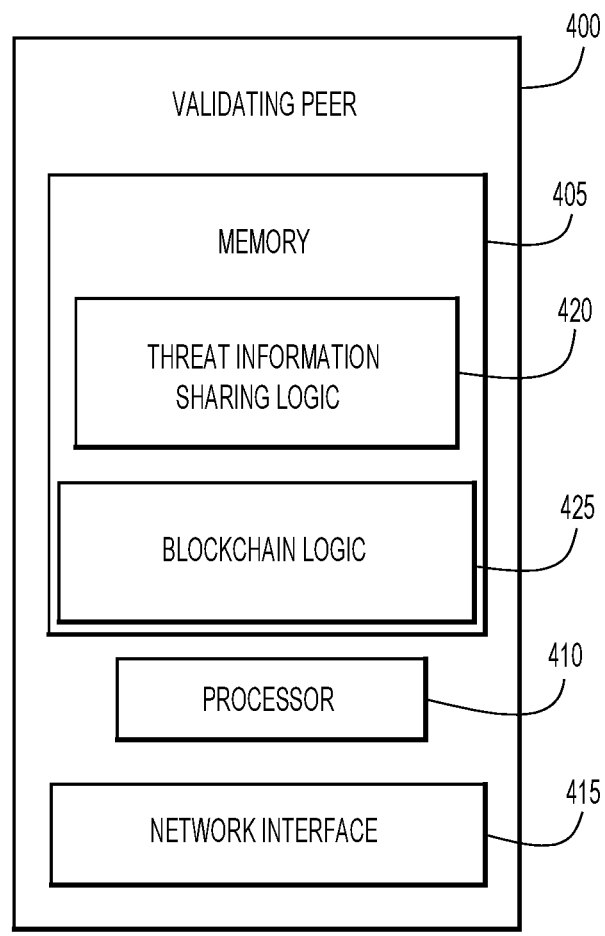
FIG. 4 is a block diagram of a computing device configured to execute threat information sharing techniques, according to an example embodiment.

FIG. 4 is a block diagram of a validating peer 400, such as one of the validating peers 115(1)-115(4) shown in FIG. 1, which is configured to implement the techniques presented herein. In this example, the validating peer 400 includes memory 405, one or more processors 410, and a network interface 415. The memory 405 stores instructions for threat information sharing logic 420 and blockchain logic 425. The network interface 415 enables network connectivity on behalf of the validating peer 400, to transmit and receive network communications. The one or more processors 410 are configured to execute instructions stored in the memory 405 (e.g., threat information sharing logic 420 and blockchain logic 425) that enables the validating peer 400 to perform the operations associated with threat information sharing techniques, such as threat information sharing logic 130(1)-130(3) shown in FIG. 1. When executed by the one or more processors 410, blockchain logic 425 enables the validating peer 400 to perform blockchain operations in a blockchain network.

The memory 405 may be read only memory (ROM), random access memory (RAM), magnetic disk storage media devices, optical storage media devices, flash memory devices, electrical, optical, or other physical/tangible memory storage devices. Thus, in general, the memory 405 may comprise one or more tangible (non-transitory) computer readable storage media (e.g., a memory device) encoded with software comprising computer executable instructions and when the software is executed (by the processor 410) it is operable to perform the operations described herein.

Figure 5:
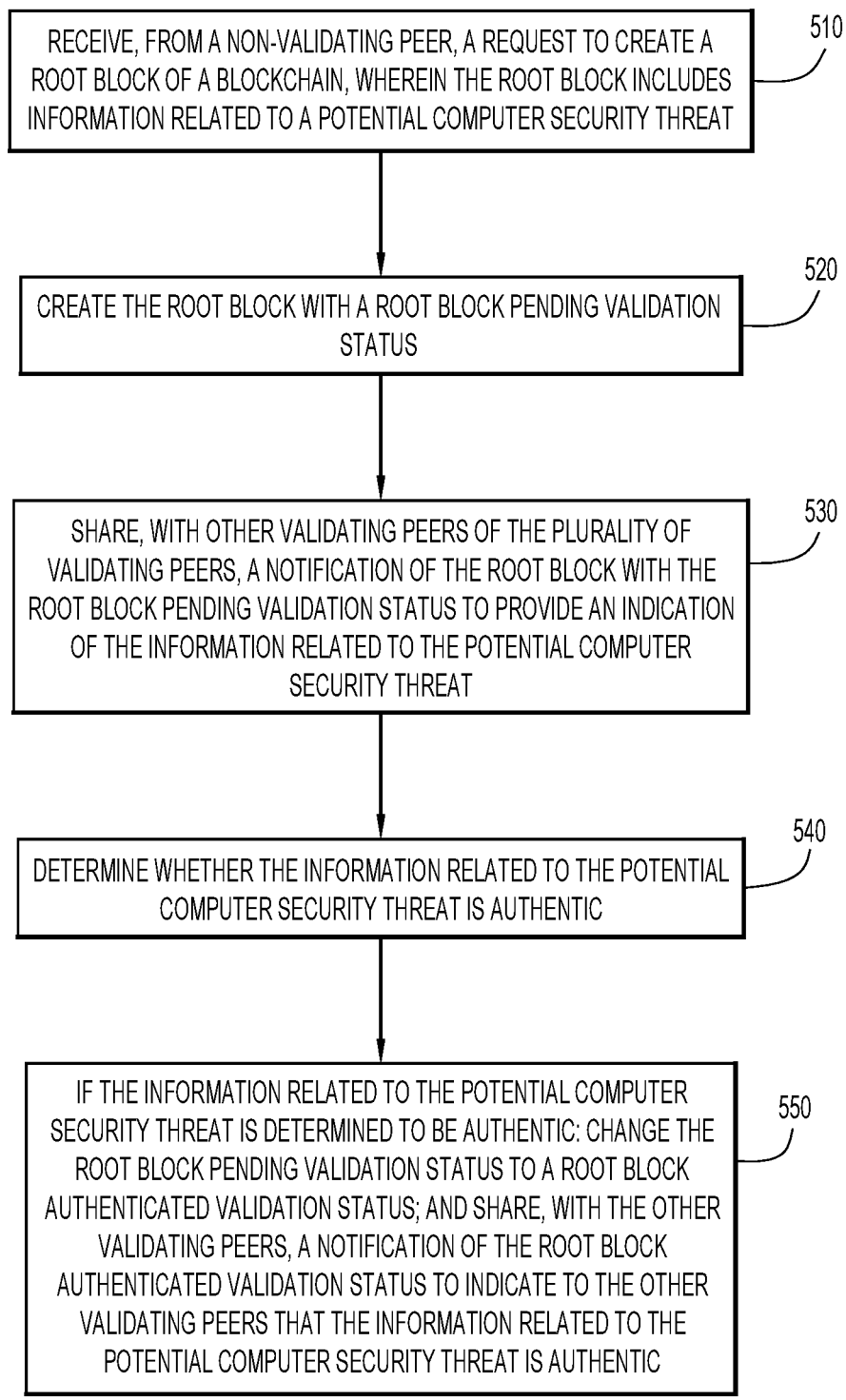
FIG. 5 is a flowchart of a generalized method for threat information sharing techniques, according to an example embodiment.

FIG. 5 is a flowchart 500 of a generalized method in accordance with examples presented herein. The method may be implemented by a validating peer of a plurality of validating peers in a blockchain network. At 510, the validating peer receives, from a non-validating peer, a request to create a root block of a blockchain, wherein the root block includes information related to a potential computer security threat. At 520, the validating peer creates the root block with a root block pending validation status. At 530, the validating peer shares, with other validating peers of the plurality of validating peers, a notification of the root block with the root block pending validation status to provide an indication of the information related to the potential computer security threat. At 540, the validating peer determines whether the information related to the potential computer security threat is authentic. At 550, if the information related to the potential computer security threat is determined to be authentic, the validating peer changes the root block pending validation status to a root block authenticated validation status and shares, with the other validating peers, a notification of the root block authenticated validation status to indicate to the other validating peers that the information related to the potential computer security threat is authentic.

In one example, a validating peer of a plurality of validating peers in a blockchain network shares the notification of the root block with an entity for which the potential computer security threat could potentially be exploited. In another example, if the information related to the potential computer security threat is determined to be authentic, the validating peer shares the notification of the root block authenticated validation status with an entity for which the potential computer security threat could potentially be exploited.

The validating peer may receiving a request to create an additional block of the blockchain, where the additional block includes supplemental information related to the potential computer security threat, and create the additional block in the blockchain with an additional block pending validation status. The validating peer may further share, with the other validating peers, a notification of the additional block to provide an indication of the supplemental information related to the potential computer security threat, and determine whether the supplemental information related to the potential computer security threat is authentic. If the supplemental information related to the potential computer security threat is determined to be authentic, the validating peer may change the additional block pending validation status to an additional block authenticated validation status and share, with the other validating peers, a notification of the additional block authenticated validation status to indicate to the other validating peers that the supplemental information related to the potential computer security threat is authentic.

The validating peer may determine whether the information related to the potential computer security threat is authentic by, based on one or more communications with the other validating peers, reaching a consensus with the other validating peers as to whether the information related to the potential computer security threat is authentic.

If the information related to the potential computer security threat is determined to be inauthentic, the validating peer may change the root block pending validation status to a root block inauthenticated validation status share, with the other validating peers, a notification of the root block inauthenticated validation status to indicate that the information related to the potential computer security threat is inauthentic. If the information related to the potential computer security threat is determined to be authentic, the validating peer may increase a reputation score of the non-validating peer above a threshold score so as to promote the non-validating peer to a particular validating peer of the plurality of validating peers. If a particular validating peer of the plurality of validating peers incorrectly determines whether the information related to the potential computer security threat is authentic, the validating peer may decrease a reputation score of the particular validating peer below a threshold score so as to demote the particular validating peer to another non-validating peer.

The techniques described herein permit users to determine which entities are trustworthy, and provide mechanisms to share information and arrive at a consensus regarding the information. This allows any entity to provide information regarding potential computer security threats. Threat information may be shared across administrative domains between semi-trusted and untrusted nodes. Decentralized mechanisms are provided to identify and potentially address security and software vulnerabilities. A security consortium may be formed between various parties (e.g., security vendors, security researchers, IoT manufactures, etc.). As provided herein, parties to the consortium may share threat information (e.g., signatures, DDoS details, flow spaces, etc.), software vulnerabilities, and/or associated fixes, and may also retrieve policy configurations to protect, for example, IoT resources.

In one form, a method is provided. The method comprises: at a validating peer of a plurality of validating peers in a blockchain network: receiving, from a non-validating peer, a request to create a root block of a blockchain, wherein the root block includes information related to a potential computer security threat; creating the root block with a root block pending validation status; sharing, with other validating peers of the plurality of validating peers, a notification of the root block with the root block pending validation status to provide an indication of the information related to the potential computer security threat; determining whether the information related to the potential computer security threat is authentic; and if the information related to the potential computer security threat is determined to be authentic: changing the root block pending validation status to a root block authenticated validation status; and sharing, with the other validating peers, a notification of the root block authenticated validation status to indicate to the other validating peers that the information related to the potential computer security threat is authentic.

In another form, an apparatus is provided. The apparatus comprises: a network interface configured to enable network communications; memory; and one or more processors coupled to the memory and the network interface, wherein the one or more processors are configured to: receive, from a non-validating peer, a request to create a root block of a blockchain, wherein the root block includes information related to a potential computer security threat; create the root block with a root block pending validation status; share, with a plurality of validating peers in a blockchain network, a notification of the root block with the root block pending validation status to provide an indication of the information related to the potential computer security threat; determine whether the information related to the potential computer security threat is authentic; and if the information related to the potential computer security threat is determined to be authentic: change the root block pending validation status to a root block authenticated validation status; and share, with the plurality of validating peers, a notification of the root block authenticated validation status to indicate to the plurality of validating peers that the information related to the potential computer security threat is authentic.

In another form, one or more non-transitory computer readable storage media are provided. The non-transitory computer readable storage media are encoded with instructions that, when executed by a processor, cause the processor to: receive, from a non-validating peer, a request to create a root block of a blockchain, wherein the root block includes information related to a potential computer security threat; create the root block with a root block pending validation status; share, with a plurality of validating peers in a blockchain network, a notification of the root block with the root block pending validation status to provide an indication of the information related to the potential computer security threat; determine whether the information related to the potential computer security threat is authentic; and if the information related to the potential computer security threat is determined to be authentic: change the root block pending validation status to a root block authenticated validation status; and share, with the plurality of validating peers, a notification of the root block authenticated validation status to indicate to the plurality of validating peers that the information related to the potential computer security threat is authentic.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a validating peer of a plurality of validating peers in a blockchain network:
obtaining, from a non-validating peer, a request to create a root block of a blockchain, wherein the root block includes information identifying a potential computer security threat and a solution for addressing the potential computer security threat, and wherein the information is used to distinguish between legitimate network traffic and illegitimate network traffic via machine learning techniques in a network coupled to the blockchain network;
creating the root block with a root block pending validation status;
sharing, with other validating peers of the plurality of validating peers, a notification of the root block with the root block pending validation status to provide an indication of the information;
determining whether the information is authentic;
if the information is determined to be authentic:
changing the root block pending validation status to a root block authenticated validation status; and
sharing, with the other validating peers, a notification of the root block authenticated validation status to indicate to the other validating peers that the information is authentic; and
if the information is determined to be inauthentic:
changing the root block pending validation status to a root block inauthenticated validation status.

2. The method of claim 1, further comprising:
at the validating peer:
sharing the notification of the root block with an entity for which the potential computer security threat could potentially be exploited.

3. The method of claim 1, further comprising:
at the validating peer:
if the information is determined to be authentic:
sharing the notification of the root block authenticated validation status with an entity for which the potential computer security threat could potentially be exploited.

4. The method of claim 1, further comprising:
at the validating peer:
obtaining a request to create an additional block of the blockchain, wherein the additional block includes supplemental information related to the potential computer security threat;
creating the additional block in the blockchain with an additional block pending validation status;
sharing, with the other validating peers, a notification of the additional block to provide an indication of the supplemental information;
determining whether the supplemental information is authentic; and
if the supplemental information is determined to be authentic:
changing the additional block pending validation status to an additional block authenticated validation status; and
sharing, with the other validating peers, a notification of the additional block authenticated validation status to indicate to the other validating peers that the supplemental information is authentic.

5. The method of claim 1, wherein:
determining whether the information is authentic includes, based on one or more communications with the other validating peers, reaching a consensus with the other validating peers as to whether the information is authentic.

6. The method of claim 1, further comprising:
at the validating peer:
if the information is determined to be inauthentic:
sharing, with the other validating peers, a notification of the root block inauthenticated validation status to indicate that the information is inauthentic.

7. The method of claim 1, further comprising:
at the validating peer:
if the information is determined to be authentic:
increasing a reputation score of the non-validating peer above a threshold score; and
in response to increasing the reputation score, promoting the non-validating peer to a particular validating peer of the plurality of validating peers.

8. The method of claim 1, further comprising:
at the validating peer:
if a particular validating peer of the plurality of validating peers incorrectly determines whether the information is authentic:
decreasing a reputation score of the particular validating peer below a threshold score; and
in response to decreasing the reputation score, demoting the particular validating peer to another non-validating peer.

9. An apparatus comprising:
a network interface configured to enable network communications;
memory; and
one or more processors, coupled to the memory and the network interface, wherein the apparatus is a validating peer of a plurality of validating peers in a blockchain network, and wherein the one or more processors are configured to:
obtain, from a non-validating peer, a request to create a root block of a blockchain, wherein the root block includes information identifying a potential computer security threat and a solution for addressing the potential computer security threat, and wherein the information is used to distinguish between legitimate network traffic and illegitimate network traffic via machine learning techniques in a network coupled to the blockchain network;
create the root block with a root block pending validation status;
share, with the plurality of validating peers in the blockchain network, a notification of the root block with the root block pending validation status to provide an indication of the information;
determine whether the information is authentic;
if the information is determined to be authentic:
change the root block pending validation status to a root block authenticated validation status; and
share, with the plurality of validating peers, a notification of the root block authenticated validation status to indicate to the plurality of validating peers that the information is authentic; and
if the information is determined to be inauthentic:
change the root block pending validation status to a root block inauthenticated validation status.

10. The apparatus of claim 9, wherein the one or more processors are further configured to:
    share the notification of the root block with an entity for which the potential computer security threat could potentially be exploited.

11. The apparatus of claim 9, wherein the one or more processors are further configured to:
    if the information is determined to be authentic:
        share the notification of the root block authenticated validation status with an entity for which the potential computer security threat could potentially be exploited.

12. The apparatus of claim 9, wherein the one or more processors are further configured to:
    obtain a request to create an additional block of the blockchain, wherein the additional block includes supplemental information related to the potential computer security threat;
    create the additional block in the blockchain with an additional block pending validation status;
    share, with the plurality of validating peers, a notification of the additional block to provide an indication of the supplemental information;
    determine whether the supplemental information is authentic; and
    if the supplemental information is determined to be authentic:
        change the additional block pending validation status to an additional block authenticated validation status; and
        share, with the plurality of validating peers, a notification of the additional block authenticated validation status to indicate to the plurality of validating peers that the supplemental information is authentic.

13. The apparatus of claim 9, wherein the one or more processors are configured to:
    determine whether the information is authentic by, based on one or more communications with the plurality of validating peers, reaching a consensus with the plurality of validating peers as to whether the information is authentic.

14. The apparatus of claim 9, wherein the one or more processors are further configured to:
    if the information is determined to be inauthentic:
        share, with the plurality of validating peers, a notification of the root block inauthenticated validation status to indicate that the information is inauthentic.

15. The apparatus of claim 9, wherein the one or more processors are further configured to:
    if the information is determined to be authentic:
        increase a reputation score of the non-validating peer above a threshold score; and
        in response to increasing the reputation score, promote the non-validating peer to a particular validating peer of the plurality of validating peers.

16. The apparatus of claim 9, wherein the one or more processors are further configured to:
    if a particular validating peer of the plurality of validating peers incorrectly determines whether the information is authentic:
        decrease a reputation score of the particular validating peer below a threshold score; and
        in response to decreasing the reputation score, demote the particular validating peer to another non-validating peer.

17. One or more non-transitory computer readable storage media encoded with instructions that, when executed by a processor of a validating peer of a plurality of validating peers in a blockchain network, cause the processor to:
    obtain, from a non-validating peer, a request to create a root block of a blockchain, wherein the root block includes information identifying a potential computer security threat and a solution for addressing the potential computer security threat, and wherein the information is used to distinguish between legitimate network traffic and illegitimate network via machine learning techniques in a network coupled to the blockchain network;
    create the root block with a root block pending validation status;
    share, with the plurality of validating peers in the blockchain network, a notification of the root block with the root block pending validation status to provide an indication of the information;
    determine whether the information is authentic;
    if the information is determined to be authentic:
        change the root block pending validation status to a root block authenticated validation status; and
        share, with the plurality of validating peers, a notification of the root block authenticated validation status to indicate to the plurality of validating peers that the information is authentic; and
    if the information is determined to be inauthentic:
        change the root block pending validation status to a root block inauthenticated validation status.

18. The one or more non-transitory computer readable storage media of claim 17, wherein the instructions further cause the processor to:
    share the notification of the root block with an entity for which the potential computer security threat could potentially be exploited.

19. The one or more non-transitory computer readable storage media of claim 17, wherein the instructions further cause the processor to:
    if the information is determined to be authentic:
        share the notification of the root block authenticated validation status with an entity for which the potential computer security threat could potentially be exploited.

20. The one or more non-transitory computer readable storage media of claim 17, wherein the instructions further cause the processor to:
    obtain a request to create an additional block of the blockchain, wherein the additional block includes supplemental information related to the potential computer security threat;
    create the additional block in the blockchain with an additional block pending validation status;
    share, with the plurality of validating peers, a notification of the additional block to provide an indication of the supplemental information;
    determine whether the supplemental information is authentic; and
    if the supplemental information is determined to be authentic:
        change the additional block pending validation status to an additional block authenticated validation status; and
        share, with the plurality of validating peers, a notification of the additional block authenticated validation status to indicate to the plurality of validating peers that the supplemental information is authentic.

\* \* \* \* \*